United States Patent
Moore et al.

(10) Patent No.: US 12,425,679 B2
(45) Date of Patent: Sep. 23, 2025

(54) DYNAMIC CONTENT STREAM GENERATION

(71) Applicant: Atmosphere.tv, Austin, TX (US)

(72) Inventors: Ben Moore, Austin, TX (US); Zach Hobbs, Austin, TX (US); Jeff DiTullio, Austin, TX (US)

(73) Assignee: Atmosphere.tv, Austin, TX (US)

( * ) Notice: Subject to any disclaimer, the term of this patent is extended or adjusted under 35 U.S.C. 154(b) by 0 days.

(21) Appl. No.: 17/847,759

(22) Filed: Jun. 23, 2022

(65) Prior Publication Data

US 2023/0421838 A1    Dec. 28, 2023

(51) Int. Cl.
| | |
|---|---|
| *H04N 21/431* | (2011.01) |
| *H04N 21/2343* | (2011.01) |
| *H04N 21/258* | (2011.01) |
| *H04N 21/2668* | (2011.01) |
| *H04N 21/4782* | (2011.01) |
| *H04N 21/81* | (2011.01) |

(52) U.S. Cl.
CPC ... *H04N 21/4316* (2013.01); *H04N 21/23439* (2013.01); *H04N 21/25841* (2013.01); *H04N 21/25891* (2013.01); *H04N 21/2668* (2013.01); *H04N 21/4782* (2013.01); *H04N 21/8173* (2013.01)

(58) Field of Classification Search
CPC ......... H04N 21/4316; H04N 21/23439; H04N 21/25841; H04N 21/25891; H04N 21/2668; H04N 21/4782; H04N 21/8173
See application file for complete search history.

(56) References Cited

U.S. PATENT DOCUMENTS

| | | | |
|---|---|---|---|
| 9,021,518 B2 | 4/2015 | Theriault | |
| 10,708,658 B2 | 7/2020 | Theriault | |
| 11,653,066 B2 * | 5/2023 | Chesson | H04N 21/8545 725/60 |
| 2012/0290393 A1 * | 11/2012 | Johansson | G06Q 30/0251 705/14.55 |
| 2016/0014482 A1 * | 1/2016 | Chen | H04N 21/8456 386/241 |
| 2017/0070764 A1 * | 3/2017 | Massoudi | H04L 67/306 |
| 2018/0199081 A1 * | 7/2018 | Silverman | H04N 21/43615 |
| 2020/0204849 A1 * | 6/2020 | Loheide | H04N 21/26208 |
| 2020/0344520 A1 * | 10/2020 | Chen | H04N 21/812 |
| 2020/0413117 A1 * | 12/2020 | Loheide | H04N 21/2393 |
| 2020/0413141 A1 * | 12/2020 | Loheide | H04N 21/8456 |

* cited by examiner

*Primary Examiner* — Nathan J Flynn
*Assistant Examiner* — Christine A Kurien

(57) ABSTRACT

Systems and methods are disclosed for dynamic content stream generation. In certain embodiments, a method may comprise executing a dynamic content stream generation system, including obtaining client details, selecting streaming video content based on the client details, and generating overlay data for the streaming video content based on the client details. The method may further comprise generating combined stream data incorporating the streaming video content and the overlay data, and displaying the combined stream data at a client device.

20 Claims, 5 Drawing Sheets

DYNAMIC CONTENT STREAM GENERATION

SUMMARY

In certain embodiments, a method may comprise executing a dynamic content stream generation system, including obtaining client details, selecting streaming video content based on the client details, and generating overlay data for the streaming video content based on the client details. The method may further comprise generating combined stream data incorporating the streaming video content and the overlay data, and displaying the combined stream data at a client device.

In certain embodiments, a system may comprise a dynamic content streaming service (DCSS) computing system configured to obtain details regarding a client device, select streaming video content based on the details, and generate overlay data for the streaming video content based on the details. The DCSS computing system may be further configured to generate combined stream data incorporating the streaming video content and the overlay data, and display the combined stream data at a client device.

In certain embodiments, a memory device storing instructions that, when executed, cause a processor to perform a method comprising executing a dynamic content stream generation system, including obtaining client details at a dynamic content streaming service (DCSS) computing system; selecting, via the DCSS computing system from a content source over a network, streaming video content based on the client details; and generating, at the DCSS computing system, overlay data for the streaming video content based on the client details. The method may further comprise generating combined stream data incorporating the streaming video content and the overlay data at the DCSS computing system, and providing, via the network, the combined stream data from the DCSS computing system to a client device associated with the client details.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
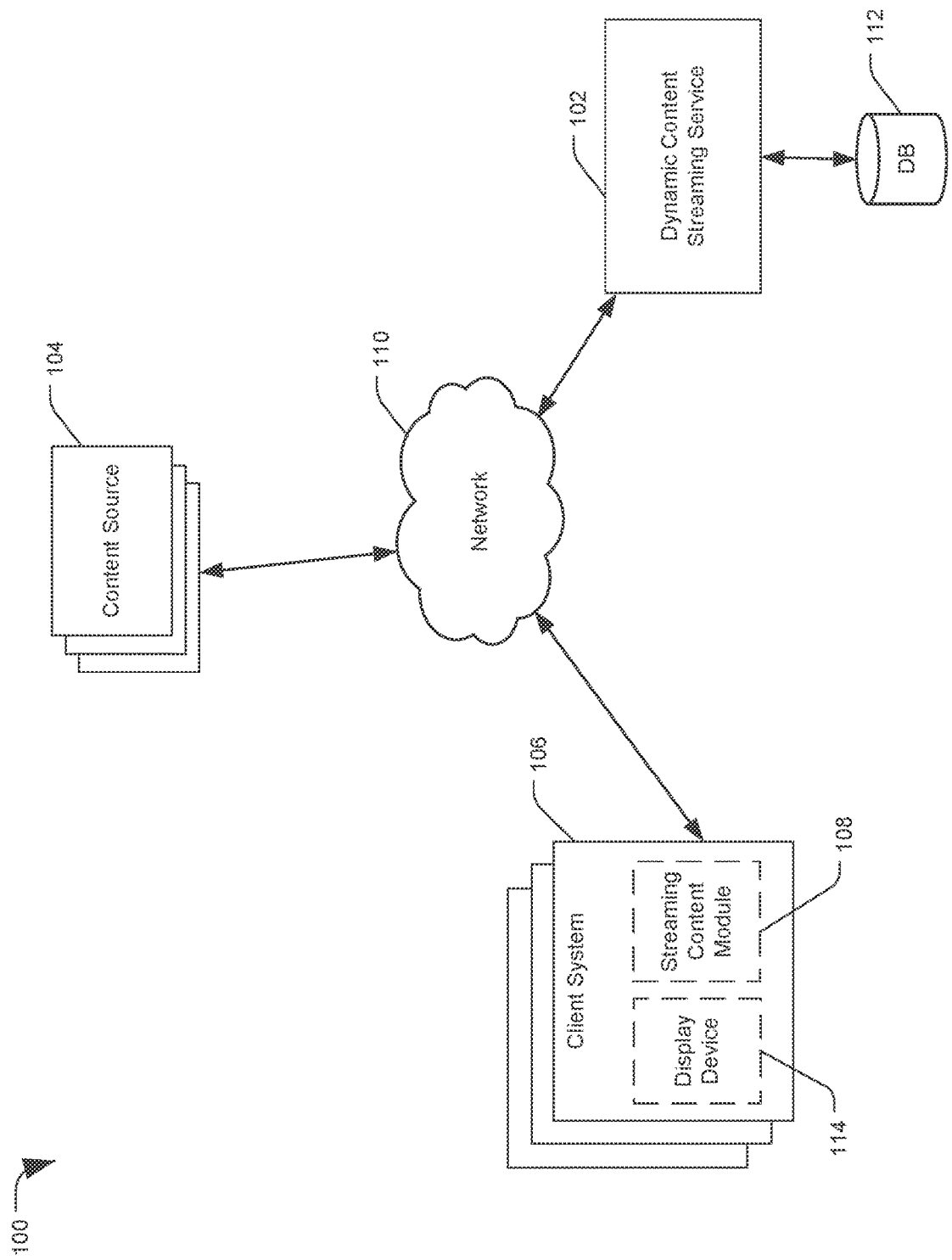
FIG. 1 is a diagram of a system configured for dynamic content stream generation, in accordance with certain embodiments of the present disclosure.

FIG. 1 depicts a diagram of a system 100 configured for dynamic content stream generation, in accordance with certain embodiments of the present disclosure. The system may include a dynamic content streaming service (DCSS) 102, one or more content sources 104, one or more client systems 106, and one or more networks 110 over which the components of system 100 may communicate and exchange data. Each or any of DCSS 102, content sources 104, client systems 106, and network 110 may be implemented via computers, servers, hardware and software modules, or other system components. Further, DCSS 102 may include or have access to a database or storage system 112. DB 112 may include one or more data storage devices, data storage mediums, data storage servers, and related data structures, and may store information about client systems 106 or associated clients, streaming content data, or other information.

Client systems 106, such as computers, smartphones, set-top boxes, or televisions, may receive streaming content such as video feeds. Client system 106 may include a streaming content module 108 and display device 114. Streaming content module 108 may receive streamed content, such as via network 110, and perform any data conversion necessary to display the streaming content on display device 114. Display device 114 may be a computer, smartphone, or similar device, or simply a display element such as a monitor or television. In some examples, a business may stream content to a television or video display device 114 at the business location for the entertainment of customers. Streaming content may include both video segments as well as supplemental overlay data, such as news tickers, sports scores, stock market updates, a listing of current or upcoming video segments, or other data. However, linear streams that are tailored according to specific requirements or preferences of the client may not be currently available. Systems and methods to generate dynamic content streams based on user specifications and preferences is desirable.

Accordingly, the DCSS 102 may be configured to dynamically generate content streams as described herein. The DCSS 102 may obtain information or specifications about client system 106 or the associated client, such as a type of business, a geographical location, demographics of the client's customers or clientele, client content preferences, a type of account the client has with the DCSS (e.g., free or premium account), how busy the client's business current is, other factors, or any combination thereof. The client specifications or information may be stored to database 112.

The DCSS 102 may obtain or have access to content, from content source 104, that may be incorporated into a dynamic stream. For example, content source 104 may provide video clips, advertisements, news data, weather, sports scores, or other content. The content may come in the form of video or audio content, as well as text or informational content that may be incorporated into an overlay or ticker that may be combined with video content within the stream. The DCSS 102 may select content from content source 104 to combine into a dynamic stream tailored to the client based on the client specifications stored to the DB 112. For example, the DCSS 102 may select content that is relevant to the client business, such as video for relevant goods or services, local news or weather, or similar tailored stream content. The DCSS 102 may generate stream data or a stream feed for the client, such as by selecting an assortment of relevant video content to play in sequence combined with an overlay that may list relevant information for the client. The stream feed may be provided over network 110 to client system 106. The stream data may be received by streaming content module 108 and displayed via display device 114.

Although an example embodiment is discussed herein where the DCSS 102 obtains the content from content source 104, generates the dynamic stream, and provides it to client system 106, other embodiments are also possible. For example, DCSS 102 may provide the client specifications or instructions on what content to combine to the content source 104, and the content source 104 may generate the dynamic stream and send it to the client system 106. In another example, the DCSS 102 may obtain streaming video content from content source 104 and provide that to the client system 106. The streaming content module 108 may generate overlay data relevant to the client and combine it with the streaming video content to generate the dynamic streaming content. The performance of various operations of the dynamic content stream generation process at different components of system 100 may provide different advantages or disadvantages, and therefore the distribution of operations may be adjusted based on a desired implementation. An example implementation is discussed in more detail in regard to FIG. 2.

Figure 2:
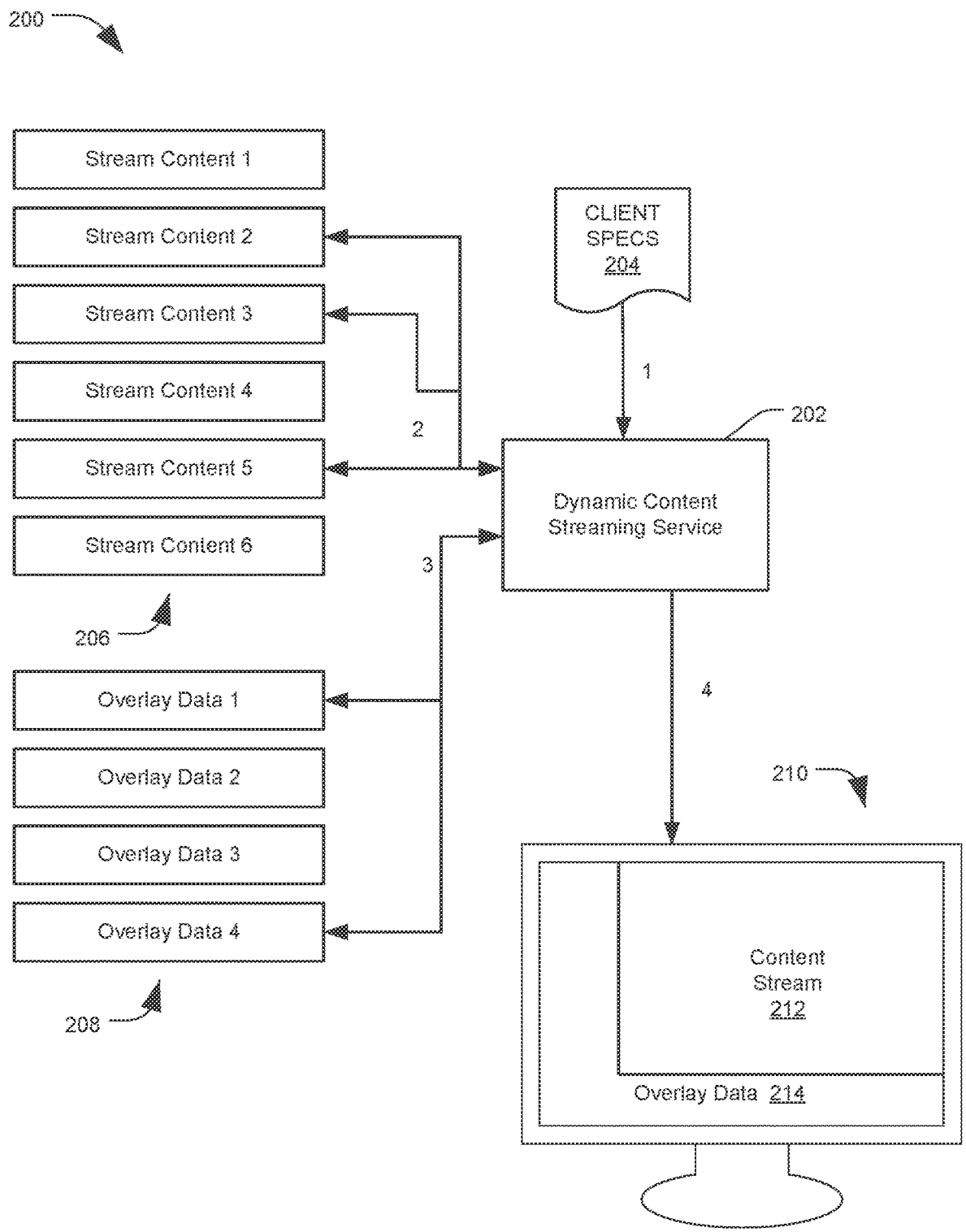
FIG. 2 is a diagram of a system configured for dynamic content stream generation, in accordance with certain embodiments of the present disclosure.

FIG. 2 depicts a diagram of a system 200 configured for dynamic content stream generation, in accordance with certain embodiments of the present disclosure. In particular, FIG. 2 presents an example embodiment of a dynamic content streaming service (DCSS) 202 generating a dynamic content stream based on the details for a particular client. In some embodiments, the system 200 of FIG. 2 may correspond to the system 100 of FIG. 1.

The DCSS 202 may first obtain client specifications 204. Client specifications 204 may include data about the client, including details of a client's business, location, clientele, preferences, or other factors that may be considering in tailoring a content stream for the client. The client specifications 204 may be obtained by the DCSS 202 during an intake process for the client, such as signing the client up for streaming services. For example, the client may enter details into a sign up webpage, or provide them via phone or a physical sign up documents. Client specifications may be obtained in other ways, such as via a user's viewing history or habits, user inputs indicating what streaming content the client likes or dislikes, via questionnaires or surveys provided to the client, based on the client updating their account or preference settings, or via other active engagement with the client. Client specifications may also be obtained based on sensors or other sources, such as a GPS sensor at the client system 210 identifying a location of the client system, using IP address information to determine approximate geographic location, noise sensors or Bluetooth sensors detecting how busy a client venue is, cameras or counters at a client's front door detecting how busy the client business is, or other data sources.

Based on the client specifications 204, the DCSS 202 may select relevant or preferred content from content sources 206 and 208. For example, content source 206 may include a plurality of categories of stream content, here indicated Stream Content 1 through Stream Content 6. Each set of stream content may have corresponding metadata, such as indicating a type of content, an appropriate age range for viewers of the content, geographical relevance for the content, or other factors. For example, some stream content may be identified as "funny video clips" which are appropriate for all age ranges, but may require audio broadcasting to be fully appreciated, whereas a client may designate whether they want content with or without audio. Some content may include advertisements for alcohol, which may be appropriate for a bar venue but inappropriate for a venue regarding health services. Content may include news updates for local regions, where the metadata may identify a relevant region. Accordingly, metadata may include identifiers such as "healthy living", "14+ age appropriate", "funny", "audio yes/no", "violent", "food/cooking", "spiritual or uplifting", "dance", "sports", "city/state", or any number of other tags or metadata. As a second step in system 200, the DCSS 202 may stream content categories 2, 3, and 5 based on the client specs 204 and the content tags or metadata. The selected stream content may be mixed, arranged, or consolidated into a content stream.

At a third step, the DCSS 202 may further select content from content source 208, which may include data already in overlay form, or which may be used to generate a data overlay. For example, overlay data may include news tickers, sports scores, stock market tickers, weather data, advertising, or other information. Overlay data from content source 208 may have corresponding metadata or tags, similar to the streaming content from content source 206. Using the client specifications 204 and metadata information, the DCSS 202 may select overlay data 1 and 4 as relevant to the client.

Once relevant stream content 206 and overlay data 208 has been selected based on the client specifications 204, the DCSS 202 may combine the content into a stream feed. For example, the DCSS 202 may generate an overlay graphic incorporating overlay data 1 and 4, such as using HTML (hypertext markup language). The overlay may be superimposed or combined with video imagery from stream content 2, 3, and 4. In some examples, the overlay may include information other than that from overlay data 208, for example an "up next," "currently playing," or "playlist" indicator identifying the accompanying stream content 206.

As a fourth step, the combined stream feed may be provided from DCSS 202 to a client system 210 for display. The display may include showing the content stream 212 along with the combined overlay data 214, such as in an "L-bar" format framing around the video content 212. The content stream 212, the overlay data 214, or both may be dynamically generated based on the client specifications 204 or the client associated with client system 210. An example implementation of the system of FIG. 2 is described in more detail in regard to FIG. 3.

Figure 3:
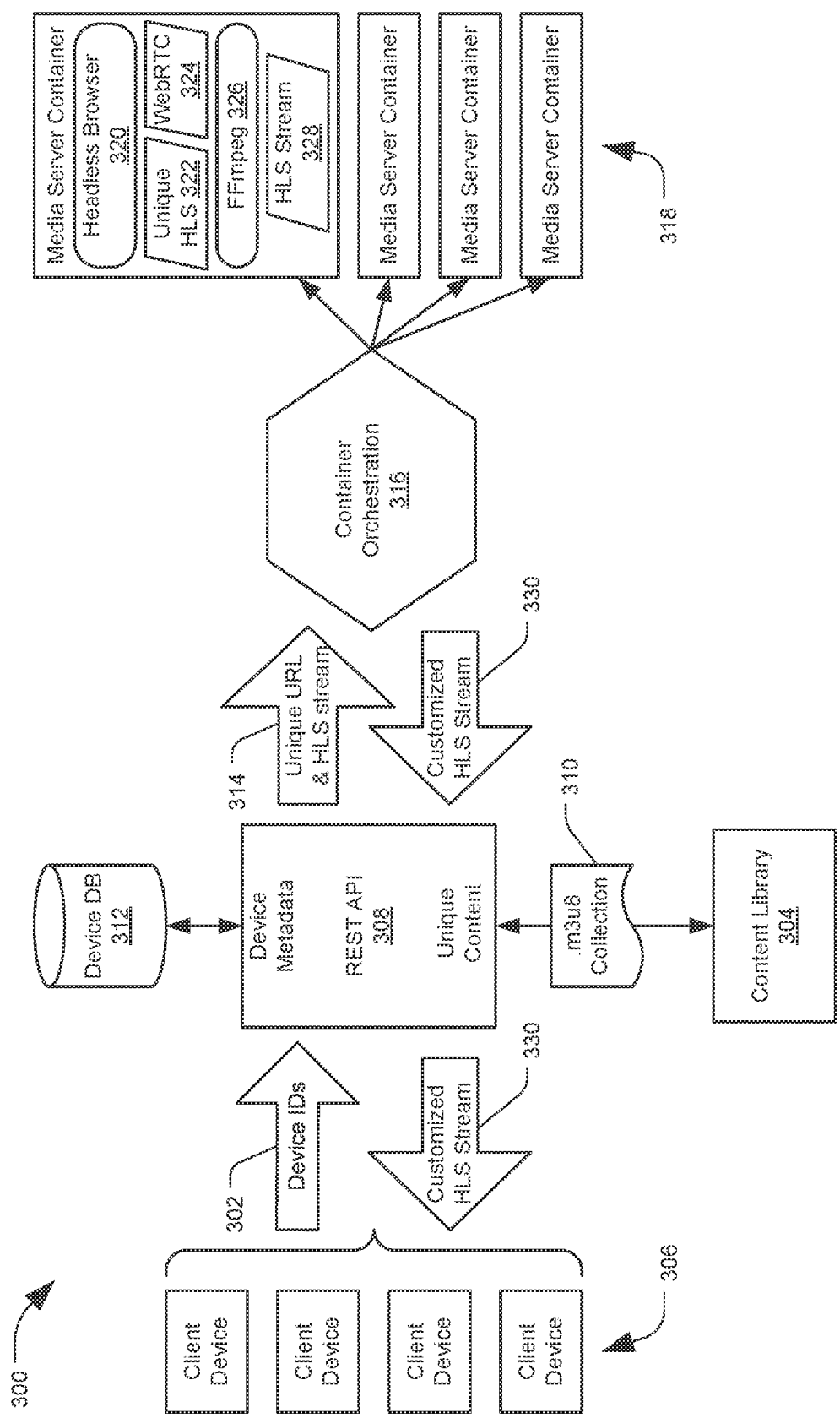
FIG. 3 is a diagram of a system configured for dynamic content stream generation, in accordance with certain embodiments of the present disclosure.

FIG. 3 depicts a diagram of a system 200 configured for dynamic content stream generation, in accordance with certain embodiments of the present disclosure. In particular, FIG. 3 presents an example embodiment of a process flow for a dynamic content streaming service (DCSS) generating a dynamic content stream based on the details for a set of client devices. In some embodiments, the system 300 of FIG. 3 may correspond to the system 100 of FIG. 1 or the system 200 of FIG. 2.

System 300 may include one or more client devices 306, which may correspond to client system 106 of FIG. 1 or client system 210 of FIG. 2. Each client device may have a device identifier (ID) 302, which may uniquely identify a particular device, and in some examples may be used for network addressing or accessing the client device 306 remotely. The device ID 302 may be provided to or obtained by a DCSS, such as DCSS 102 of FIG. 1, or DCSS 202 of FIG. 2.

In some examples, a DCSS may be running or employing software to manage data and orchestrate dynamic stream creation and delivery. In the depicted embodiment, the DCSS may employ a representational state transfer (REST) web service architecture, such as a REST or RESTful API (application programming interface) 308. The REST API 308 may have access to a database (DB) 312 with device metadata. In the device DB 312, a device ID 302 may be associated with one or more client specifications or information about the client or client device 306 that can be used to determine what streaming content to include in a customized stream for that client device 306. For example, a device having identifier x953b1 may have associated metadata indicating the device is in Portland, Oregon, that the client business for the device is an adult venue serving alcohol, and that content preferences have been set to sporting events.

Based on the device metadata in the device DB 312, the REST API 308 may generate a dynamic content stream for a client device 306, based on selecting content from a content library 304. The content library 304 may correspond to content source 104 of FIG. 1 or content sources 206 and 208 of FIG. 2. Content from content library 304 may be accessed via web addressing links or other access protocols. For example, an .m3u8 file or collection 310 may be used to access the content, which may be a UTF-8 encoded playlist file, a plain text file that can be used by audio and video players to describe where media files are located. The REST API 308 may generate a dynamic or customized playlist of content from content library 304 based on the metadata for a given client device 306. For example, the REST API 308 may organize the content into a customized HLS (HTTP live stream) itself, or may present the client device metadata to the content library 304 for generating a customized HLS. The HLS stream may be raw content without any overlay data. The REST API 308 may also generate a unique URL (uniform resource locator) related to dynamic or customized overlay data, and may be based on the customized playlist. In some examples, the unique URL may be a link to an HTML graphic overlay customized to the particular client device, or custom parameters for generating the graphic overlay to be layered onto or presented with the content stream. The combined unique URL and HLS stream 314 may include access information or references to video, audio, or overlay content to be combined into a stream feed for a particular client device 306.

The REST API 308 may provide the unique URL and HLS stream 314 to a container orchestration module 316, which may manage and coordinate one or more media server containers 318. A container may be a collection of software component instances, such as a package of application code and its dependencies (e.g., libraries, binaries, and any additional configuration files). A media server container 318 may be the software used to provide the dynamic stream to a client device 306. In some examples, a separate media server container 318 may run for each separate stream, up to having a single media server container 318 executing for each client device 306 (although in some embodiments, multiple client devices may receive the same stream). The container orchestration module 316 may be used for the automation of management for containerized workloads and services, including provisioning, deploying, scaling (up and down), networking, load balancing, or other operations. The container orchestration module 316 may receive the unique URL and HLS stream 314, and either provision a new media server container 318 for the corresponding device client device 306, or direct an existing media server container 318 to implement the stream 314.

An example media server container 318 may include a headless web browser 320, a unique HLS 322, a WebRTC (real-time communication) 324, an FFmpeg ("fast forward" moving picture experts group) 326, and an HLS stream 328. A headless browser 320 (e.g., headless Chrome®) may be a version of a browser that operates without UI elements. The headless browser 320 may be used to generate a customized stream using web-based content sources, such as a web-based overlay frame and web-based streaming audio and video content. The unique HLS 322 may include the unique HLS from the REST API 308 identifying the content to include in the dynamic stream. The HLS 322 may be in the form of a pre-made content stream, or a collection of links or playlist metadata for accessing the content, e.g. from content library 304. The WebRTC 324 may be an example open-source system enabling RTC for web browsers via APIs. The WebRTC 324 may enable peer-to-peer or streaming communications between systems, enabling the media server container 318 to stream a content stream to a client device 306. FFmpeg 326 may include a suite of libraries and programs for processing video, audio, or other multimedia streams. FFmpeg 326, or another program or service, may perform format transcoding, editing, scaling, post-production and standards compliance, and other processing operations for a content stream. The media server container 318 may use the unique URL and HLS stream 314 to combine generate overlay data, combine overlay data with a content stream, and generate a combined and customized HLS stream 328. The finalized HLS stream 328 may be broadcast 330 to client device 306 via container orchestration module 316 and REST API 308. The stream 330 may be provided to the appropriate client device 306 based on the associated device ID 302 and network addressing for the client device 306.

The components of system 300 may be distributed among one or more devices. For example, REST API 308, container orchestration module 316, and media server containers 318 may be implemented at a dynamic content streaming service 102, while content library 304 may be implemented at a content source 104, and client devices 306 may be implemented at client system 106. However, various components, such as container orchestration module 316 and media server containers 318 may be implemented at a different of the above systems, or a separate system entirely. An example method for implementing dynamic content stream generation is discussed in regard to FIG. 4.

Figure 4:
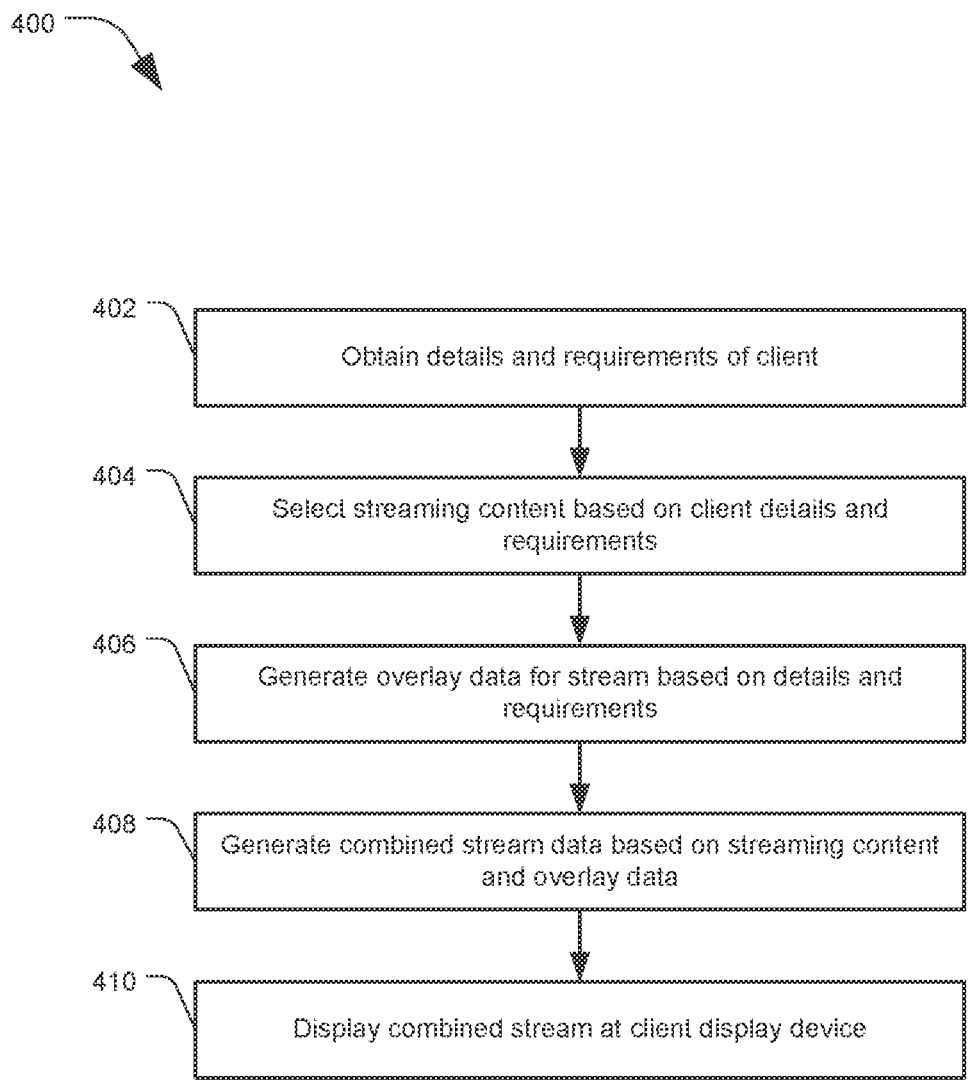
FIG. 4 depicts a flowchart of an example method for dynamic content stream generation, in accordance with certain embodiments of the present disclosure.

FIG. 4 depicts a flowchart 400 of an example method for dynamic content stream generation, in accordance with certain embodiments of the present disclosure. In particular, the method of FIG. 4 may be a process for determining content to include in a dynamic stream based on particular specifications and preferences of a client. The method of FIG. 4 may be implemented by systems shown in FIG. 1, such as dynamic content streaming service (DCSS) 102, content source 104, client system 106 and streaming content module 108, or some combination thereof, generally collectively referred to as the DCSS 102.

The method may include obtaining details and requirements of a client, at 402. For example, details about a client, including a type of associated business, location, preferences, or other information, may be obtained in a variety of ways, and may be stored as client information in a database or other data structure. For example, client details may be obtained as part of a sign-up process for a streaming service, entered via a smartphone app or website, entered via a streaming set-top box or device (e.g., client system 106 or streaming content module 108), or otherwise provided by a client directly. In some examples, streaming habits or content preferences may be monitored passively, or sensors may be used to determine a location of a client venue, how busy the venue is, or other details.

At 404, the method may include selecting streaming content based on the client details and requirements. For example, a DCSS may access one or more content sources, each of which may provide access to a plurality of pieces of content. The details of each piece of content may be determined based on the content source (e.g., a first content source may provide only short family-friendly video segments, while a second content source may provide only national sports clips), or the content pieces may be labeled with identifying metadata or tags, or some combination thereof. Content may include streamable video content, text or data-based content, or a combination thereof.

The method may include generating overlay data for a stream based on the client details and requirements, at 406. For example, text or data-based content may be incorporated into an overlay for a stream, for example in the form of a data ticker along the bottom, or periodically updated informational displays. In some examples, the selected video content may also influence overlay data. For example, details about video segments may be incorporated into the overlay, such as titles, artists, subtitles or captions, or other information. The overlay data may be generated as an HTML overlay data structure that may be combined with a video stream.

At 408, the method may include generating combined stream data based on the selected streaming content and the generated overlay data. In an example embodiment, the streaming content includes a plurality of independent video clips, and the overlay data includes text-based information that cycles periodically. Generating the combined stream data may include combining the plurality of independent video clips into a continuous single video stream, and merging the continuous single video stream with the overlay data to create a continuous video stream having a periodically cycling text accompaniment. The streaming data and the overlay data may be combined at various points of a system, such as at the DCSS, the content source, the client system via a streaming content module, or at other points in the system. In some examples, the stream data may be transmitted over a network, for example using an HTTP Live Streaming (HLS) protocol, which may break stream data into a sequence of short HTTP-based file downloads. The combined stream data may then be displayed at the client display device, at 410.

Figure 5:
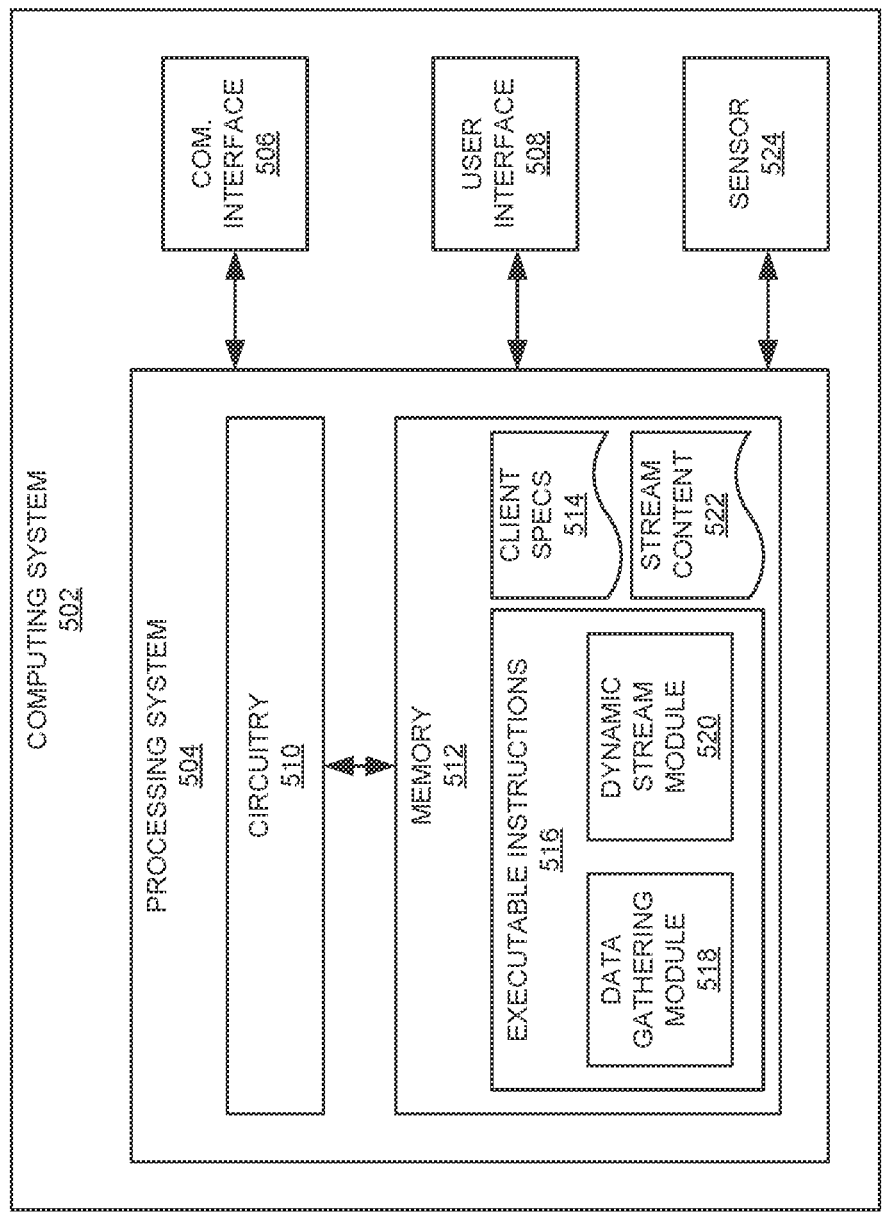
FIG. 5 is a diagram of a system configured for dynamic content stream generation, in accordance with certain embodiments of the present disclosure.

Turning now to FIG. 5, a diagram of a system 500 configured for dynamic content stream generation is depicted, in accordance with certain embodiments of the present disclosure. In particular, FIG. 5 depicts a computer system 502, which may be an example of any computing system that may be employed to perform the operations of dynamic content streaming service (DCSS) 102, content source 104, client system 106 or streaming content module 108, and related processes and methods. Computing system 502 may include a processing system 504, a communication interface 506, a user interface 508, and a sensor 524. Computing system 502 may include other components, such as a battery and enclosure, that are not shown for clarity. Computing system 502 may comprise one or more server computing systems, desktop computing systems, laptop computing systems, smartphone devices, set-top or streaming boxes, or any other computing system, including combinations thereof.

Communication interface 506 may comprise components that communicate over communication links, such as network cards, ports, radio frequency (RF), processing circuitry and software, or some other communication devices. Communication interface 506 may be configured to communicate over metallic, wireless, or optical links. Communication interface 506 may be configured to use Time Division Multiplex (TDM), Internet Protocol (IP), Ethernet, optical networking, wireless protocols, communication signaling, other communication formats, or any combinations thereof. In particular, communication interface 506 may be configured to communicate over a network 110 with DCSS 102, client systems 106, content sources 104, or other external systems. Communication interface 506 may also enable communication with local external devices, such as DCSS 102 communicating with a local storage system for DB 112.

User interface 508 may comprise components that interact with a user to receive user inputs and to present media or other information. User interface 508 may include a display screen, touch screen, touch pad, keyboard, buttons, speaker, microphone, pointer device or interface, communication port, other user input/output apparatus, or any combination thereof. In some examples, user interface 508 may be a module configured to interface with a separate system for presenting information and receiving inputs. For example, computing system 502 may have limited or no direct user input components, but it connects (e.g., via communication interface 506) to a monitor or other device that may receive inputs via touch screen, remote control, or other input method, which inputs are then provided to computing system 502.

Sensor 524 may include one or more systems or components configured to sense aspects about the environment of computing system 502. For example, sensor 524 may include a GPS sensor configured to determine a geographic location of computing system 502. In some embodiments, sensor 524 may include a Bluetooth sensor that may detect or communicate with one or more Bluetooth-enabled devices proximate to the computing system 502. The number of detected Bluetooth-enabled devices may provide an indication of how many Bluetooth-capable smartphones or similar devices are nearby, which number may be used to extrapolate how busy or crowded the area is. Sensor 524 may include a noise sensor, camera, or other system which may detect activity or noise level near the computing system 502. The information detected by sensor 524 may be used to customize a stream, such as by providing more lively content when a venue is busy, or adjusting a frequency of type of advertising.

Processing system 504 may be linked to communication interface 506, user interface 508, and sensor 524. Processing system 504 can include processing circuitry 510 and memory device 512. Memory device 512 can store executable instructions or other operating software 516, as well as non-executable data files, such as client specifications or data 514 and stream content 522.

Processing circuitry 510 may comprise a microprocessor and other circuitry that can retrieve and execute instructions 516 from memory device 512. Memory 512 may comprise a non-volatile data storage medium, such as a disk drive or solid state drive, or volatile memory such as random access memories (RAM) and dynamic RAM (DRAM), or any other memory apparatus. In some examples, processing circuitry 510 may be mounted on a circuit board that may also hold memory device 512 and portions of communication interface 506, user interface 508, or sensor 524.

Executable instructions 516 may comprise computer programs, firmware, or some other form of machine-readable processing instructions. Executable instructions 516 may include data gathering module 518, and dynamic stream module 520, although related operations may be handled by multiple different modules or programs (potentially located on multiple computing devices), all operations may be performed by a single module, or additional modules may be included in executable instructions 516. For example, embodiments of data gathering module 518 and dynamic stream module 520 may be implemented by DCSS 102, client system 106 or streaming content module 108, content source 104, or a combination thereof. Executable instructions 516 may further include an operating system, utilities, drivers, network interfaces, applications, or other types of software. When executed by processing circuitry 510, executable instructions 516 may direct processing system 504 to operate computing system 502 as described herein.

Data gathering module 518 may be a set of instructions for obtaining information related to client specifications or information. In an example embodiment, data gathering module 518 may generate and present a graphical user interface ("GUI") through which a user may enter data relating to a client, such as details of the client business where a stream may be broadcast, a client's location, or a client's preferred type of viewing content. Data may be obtained via other systems, or by sensing details about the environment or location of computing system 502. The data may be gathered through user interface 508, via sensor 524, or from a remote system over communication interface 506. Data obtained via data gathering module 518 may be stored locally (e.g., as client specifications 514) or transmitted to a remote system via communication interface 506.

Dynamic stream module 520 may include a set of instructions that, when executed, cause the processing system to determine content 522 to include in a client stream based on the client specifications 514, to generate a stream 522 (e.g., including overlay data and audio and visual content) based on the determined content, or to receive and display (e.g., via user interface 508) stream content 522 received via communication interface 506.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   executing a dynamic content stream generation system, including:
   obtaining client details about a client associated with a client device, the client details including a type of business at which the client device is located;
   selecting streaming video content based on the client details;
   generating overlay data for the streaming video content based on the client details;
   generating combined stream data incorporating the streaming video content and the overlay data; and
   displaying the combined stream data at the client device.

2. The method of claim 1 further comprising:
   obtaining the client details at a dynamic content streaming service (DCSS) computing system;
   selecting the streaming video content, via the DCSS computing system over a network, from a content source;
   generating the overlay data at the DCSS computing system; and
   providing the combined stream data from the DCSS computing system to the client device via the network.

3. The method of claim 1 further comprising:
   generating a plurality of different combined stream data for display via a plurality of client devices including the client device;
   implementing a plurality of software containers to manage the plurality of different combined stream data; and
   generating the combined stream data at a first software container corresponding to the client device.

4. The method of claim 3 further comprising:
   the streaming video content and the overlay data include web-based content; and
   combining the streaming video content and the overlay data into the combined stream data via a headless web browser of the first software container.

5. The method of claim 4 further comprising:
   implementing a container orchestration module configured to manage the plurality of software containers;
   providing addressing information for the streaming video content and the overlay data to the container orchestration module; and presenting the addressing information for the streaming video content and the overlay data from the container orchestration module to the first software container based on the client device corresponding to the first software container.

6. The method of claim 1 further comprising the client details include a location of the client device.

7. The method of claim 1 further comprising the client details include client-selected content preferences.

8. A system comprising:
a dynamic content streaming service (DCSS) computing system configured to:
obtain details regarding specifications of a client device, including a device identifier for the client device;
obtain client details about a client associated with the client device, the client details including a type of business at which the client device is located;
select streaming video content based on the details and client details;
generate overlay data for the streaming video content based on the details and client details;
generate combined stream data incorporating the streaming video content and the overlay data; and
display the combined stream data at the client device.

9. The system of claim 8 comprising the DCSS computing system further configured to:
select the streaming video content, via the DCSS over a network, from a content source;
generate the overlay data at the DCSS computing system; and
provide the combined stream data from the DCSS computing system to the client device via the network.

10. The system of claim 8 comprising the DCSS computing system further configured to:
generate a plurality of different combined stream data for display via a plurality of client devices including the client device;
implement a plurality of software containers to manage the plurality of different combined stream data; and
generate the combined stream data at a first software container corresponding to the client device.

11. The system of claim 10 further comprising:
the streaming video content and the overlay data include web-based content; and
the DCSS computing system further configured to combine the streaming video content and the overlay data into the combined stream data via a headless web browser of the first software container.

12. The system of claim 11 further comprising:
the streaming video content includes a plurality of independent video clips;
the overlay data includes text-based information that cycles periodically;
the DCSS computing system configured to generate the combined stream data, further including:
combine the plurality of independent video clips into a continuous single video stream; and
merge the continuous single video stream with the overlay data to create a continuous video stream having a periodically cycling text accompaniment.

13. The system of claim 11 comprising the DCSS computing system further configured to:
implement a container orchestration module configured to manage the plurality of software containers;

provide addressing information for the streaming video content and the overlay data to the container orchestration module; and
present the addressing information for the streaming video content and the overlay data from the container orchestration module to the first software container based on the client device corresponding to the first software container.

14. The system of claim 9 further comprising:
the details include:
content-selection specifications for the client device; and
the DCSS computing system further configured to store the device identifier and the content-selection specifications to a database.

15. A memory device storing instructions that, when executed, cause a processor to perform a method comprising:
executing a dynamic content stream generation system to generate a plurality of different combined stream data for display via a plurality of client devices, including:
obtaining client details about a client associated with a client device at a dynamic content streaming service (DCSS) computing system;
selecting, via the DCSS computing system from a content source over a network, streaming video content based on the client details;
generating, at the DCSS computing system, overlay data for the streaming video content based on the client details;
generating combined stream data incorporating the streaming video content and the overlay data at the DCSS computing system;
providing, via the network, the combined stream data from the DCSS computing system to the client device associated with the client details;
implementing a plurality of software containers to manage corresponding ones of the plurality of different combined stream data; and
generating the combined stream data at a first software container corresponding to the client device.

16. The memory device of claim 15 storing instructions that, when executed, cause the processor to perform the method further comprising:
the streaming video content and the overlay data include web-based content; and
generating the combined stream data includes combining the streaming video content and the overlay data into the combined stream data via a headless web browser of the first software container.

17. The memory device of claim 15 storing instructions that, when executed, cause the processor to perform the method further comprising:
the streaming video content includes a plurality of independent video clips;
the overlay data includes text-based information that cycles periodically;
generating the combined stream data includes:
combining the plurality of independent video clips into a continuous single video stream; and
merging the continuous single video stream with the overlay data to create a continuous video stream having a periodically cycling text accompaniment.

18. The memory device of claim 15 storing instructions that, when executed, cause the processor to perform the method further comprising:
obtaining the client details, including:

a device identifier for the client device; and
content-selection specifications for the client device; and
storing the device identifier and the content-selection specifications to a database.

19. The memory device of claim 15 storing instructions that, when executed, cause the processor to perform the method further comprising:
obtaining the client details, including a location of the client device; and
generating the overlay data based on the client details, including generating the overlay data to include information on events local to the location of the client device.

20. The memory device of claim 15 storing instructions that, when executed, cause the processor to perform the method further comprising:
the streaming video content includes a plurality of independent video clips;
the overlay data includes text-based information that cycles periodically;
generating the combined stream data, further including:
 combining the plurality of independent video clips into a continuous single video stream; and
 merging the continuous single video stream with the overlay data to create a continuous video stream having a periodically cycling text accompaniment.

* * * * *